United States Patent [19]

Kuwabara et al.

[11] Patent Number: 4,896,169
[45] Date of Patent: Jan. 23, 1990

[54] LASER SCAN RECORDING APPARATUS USING APERTURE PLATES TO FORM SHIFTED ROWS OF BEAMS WHICH ARE MODULATED AND CONVERGED ON PHOTOSENSITIVE MATERIAL

[75] Inventors: Akira Kuwabara; Yasufumi Koyama, both of Kyoto, Japan

[73] Assignee: Dainippon Screen Mfg. Co., Ltd., Japan

[21] Appl. No.: 210,227

[22] Filed: Jun. 23, 1988

[30] Foreign Application Priority Data

Jun. 23, 1987 [JP] Japan ................................. 62-156257

[51] Int. Cl.[4] .......................... G01D 9/42; G01D 15/14
[52] U.S. Cl. ..................................... 346/108; 346/160
[58] Field of Search ....................... 358/296, 300, 302; 346/108, 160; 350/358

[56] References Cited

U.S. PATENT DOCUMENTS 4,053,898 10/1977 Hirayama ............................ 346/108
4,496,956 1/1985 Mitsuka .............................. 346/108

Primary Examiner—B. A. Reynolds
Assistant Examiner—Scott A. Roger
Attorney, Agent, or Firm—Ostrolenk, Faber, Gerb & Soffen

[57] ABSTRACT

An apparatus for recording a binary image of a printed circuit pattern on photosensitive material. First and second rows of recording spots scan the photosensitive material. The second row is shifted by a length corresponding to approximately half the diameter of the recording spots. Each of the recording spots covers an area equal to approximaqtely four pixels. Whether a pixel is to be exposed is determined on the basis of a logical sum or product of data corresponding to four adjacent pixels.

12 Claims, 7 Drawing Sheets

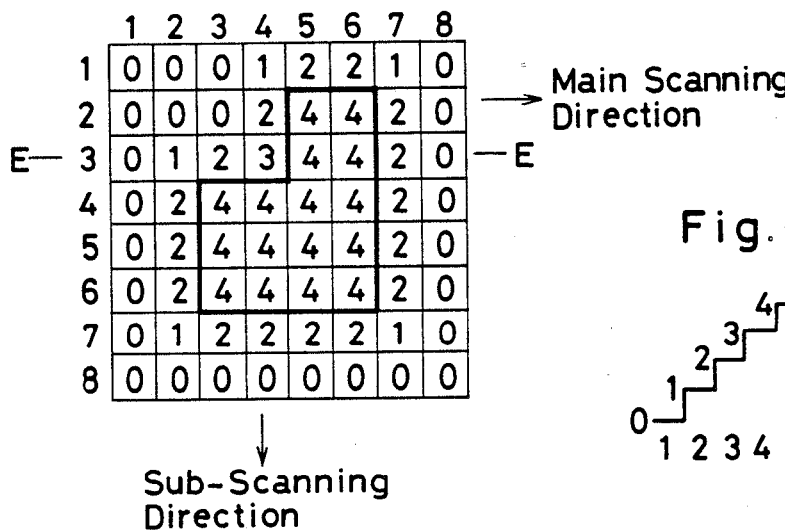
Fig. 6-(A)
Fig. 6-(B)
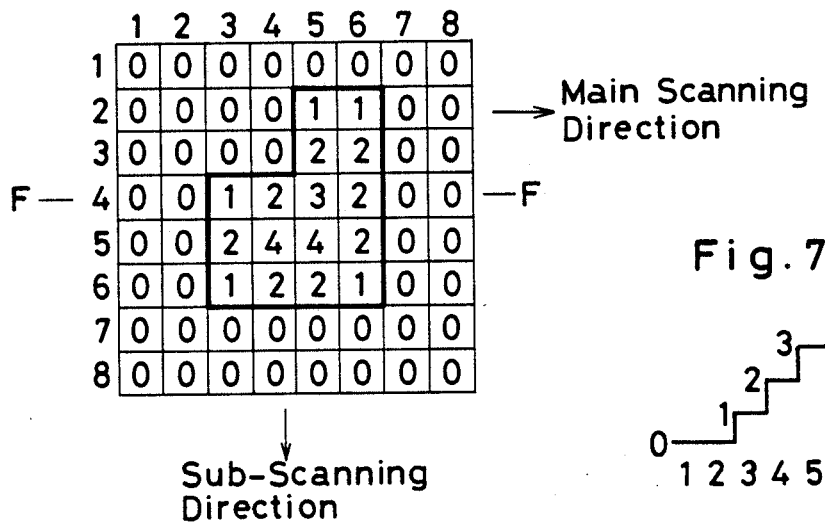
Fig. 7-(A)
Fig. 7-(B)

Fig. 8 Prior Art

|   | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 1 | 2 | 1 | 0 |
| 3 | 0 | 0 | 0 | 0 | 2 | 4 | 2 | 0 |
| 4 | 0 | 0 | 1 | 2 | 3 | 4 | 2 | 0 |
| 5 | 0 | 0 | 2 | 4 | 4 | 4 | 2 | 0 |
| 6 | 0 | 0 | 2 | 4 | 4 | 4 | 2 | 0 |
| 7 | 0 | 0 | 1 | 2 | 2 | 2 | 1 | 0 |
| 8 | 0 | 0 | 0 | 0 | 0 | 0 | 0 | 0 |

→ Main Scanning Direction

↓ Sub-Scanning Direction

4,896,169

LASER SCAN RECORDING APPARATUS USING APERTURE PLATES TO FORM SHIFTED ROWS OF BEAMS WHICH ARE MODULATED AND CONVERGED ON PHOTOSENSITIVE MATERIAL

BACKGROUND OF THE INVENTION

The present invention relates to an apparatus for recording a binary image, e.g. a line image, by scanning a light beam or beams, and more particularly to an apparatus for recording a binary image for use in manufacturing a printed wiring board with high accuracy.

An apparatus (such as the apparatus shown in FIG. 9) has been used to record a binary image. In the apparatus, a laser beam $L_0$ emitted from a laser tube 91 is divided by a beam splitter 92 into a plurality of beams, e.g. twenty beams. (Only six beams are illustrated in the drawing for simplicity of illustration.) The beams are received by an acousto-optical modulator (hereinafter referred to as "AOM") 93, by which the beams are modulated according to image signals Is applied thereto. The "beams modulated" are focused on a photosensitive material 96 by an objective lens 94, the photosensitive material 96 being loaded on the peripheral surface of a recording cylinder 95. The recording cylinder 95 rotates in the direction denoted by an arrow X (hereinafter referred to as "main scanning direction"), while it is moved in the direction denoted by an arrow Y (hereinafter referred to as "subscanning direction"), whereby a desired binary image is recorded on the photosensitive material 96 by the laser beams.

To record of such a binary image as a circuit pattern for a printed wiring board, two factors are most important: (1) smoothness of the margin of the image and (2) high dimensional accuracy. Conventionally, the diameter of each of the recording beams is expanded considerably (relative to that of the corresponding pixel), to improve the smoothness of the margin. The recording beams are overlapped considerably to improve the smoothness of the margin of the image.

FIG. 10 is a graph showing a distribution of light quantity imparted onto the photosensitive material. As shown in the drawing, the quantity of light imparted by each of the respective recording beams represents a Gaussian distribution denoted by numerals $W_1$ to $W_n$. The distribution of light quantity as a whole is shown by a curve $W_s$.

Different kinds of photosensitive materials have different inherent, the critical exposure, values, as denoted by numerals $e_0$ to $e_2$, according to the sensitivity of the particular photosensitive material. Therefore the recording width effected by the beams is variable, as shown by numerals $d_0$ to $d_2$, according to the critical exposure values inherent in the different kinds of photosensitive materials. Such variation in the recording width may be as great as one pixel. This creates a serious problem of accuracy. That is, an inaccurate circuit pattern may be created when the recording width is varied by as much as one pixel.

Particularly in manufacturing a printed wiring board, it is often the case that several circuit pattern images must be repeatedly on a photosensitive material with high accuracy, e.g. within the range of $\pm 3.0$ μm. Accordingly, the recording width must be accurately controlled so that even different kinds of photosensitive materials can be recorded with a highly accurate binary image, e.g. within the range of $\pm 3.0$ μm.

SUMMARY OF THE INVENTION

Accordingly, it is a principal object of the invention to provide a novel apparatus which ensures the accurate dimension of a circuit pattern.

It is another object of the invention to provide an apparatus which can control the recording line width so as to be adaptable for different photosensitive materials.

It is a further object of the invention to provide an apparatus which ensures smoothness of the margin of an image recorded on a photosensitive material.

The aforementioned objects are accomplished by the present invention, with an apparatus for recording a binary image on a photosensitive material, which includes a light source emitting a recording beam for exposure of the photosensitive material; defining means for defining a part of uniform light quantity of the recording beam, said defining means imparting a row of a plurality of recording beams; modulator means for modulating the respective recording beams independently; control means for controlling said modulator means on the basis of the image signals of a desired image; and an objective lens reducing both the diameter of the recording beams and the interval between the adjacent recording beams, so that the respective diameters of the recording beams covers the area corresponding to at least four adjacent pixels in matrix, wherein said control means comprises at least two line memories, to which image data of each of the scanning lines is stored in order; latch means connected with the selected means for synchronously outputting the pixel data; and either one of both an AND gate and an OR gate alternatively connected with the latch means, either the AND gate or the OR gate outputting the control signals for the modulator means.

Practically, it is preferable to provide diffusing means for diffusing the recording beam and collimator means for collimating the recording beam diffused, these means being placed between the light source and the defining means.

It is also preferable that the control means further comprises selector means connected with the memories for selecting pixel data corresponding to at least four adjacent pixels in a matrix.

The apparatus further comprises first feed means for feeding the photosensitive material to and fro in a first direction, and second feed means for feeding the row of the recording beams in a second direction, the row of the recording beams being aligned in the second direction, the second feed means feeding the same by the length of the row when the feeding in the first direction is completed, whereby the whole surface of the photosensitive material is scanned by the recording beams.

Preferably, the apparatus further comprises dividing means for dividing the recording beam emitted from the light source into at least two optical paths, a set of optical elements including the light source, diffusing means, collimator means, defining means, modulator means, control means and objective lens is provided along the each of optical paths. In this case, the control means further comprises a first and a second memory connected with the output terminal of both the AND gate and the OR gate, respectively. A delay circuit is connected with the first memory, outputs from both the delay circuit and the second memory being respectively connected with the modulator means to control the modulator means synchronously with each other.

The invention is also directed to an apparatus for exposing photosensitive material to form an image thereon, comprising: (a) a first subsystem, including means for converging four light beams onto each pixel within an image; and (b) a second subsystem, including: (i) means for converging a light beam onto each pixel within the image; and (ii) means for modulating light beams so that no light beam is converged onto a pixel outside of the image; and (c) means for selectively enabling and disabling the first and second subsystems.

Having the aforementioned features, the present invention has the following useful advantages:

An accurate pattern image can be recorded on a photosensitive material even when different kinds of photosensitive materials (having different sensitivities) are used.

The width of a recording line imparted on photosensitive material can be appropriately controlled, when spread or reduction of the line width is caused during a subsequent process.

Furthermore, smoothness of the margin of the image recorded on the photosensitive material can be improved without formation of interference fringes.

Other novel features and advantages of the present invention will become apparent in the course of the following detailed description of preferred embodiments of the invention taken together with the accompanying drawings.

BRIEF DESCRIPTION OF THE DRAWINGS

FIGS. 6-(A) and 7-(A) are conceptual views of pattern images to be recorded on photosensitive material.

FIGS. 6-(B) and 7-(B) are schematic graphs showing exposure values corresponding to FIGS. 6-(A) and 7-(A), respectively;

FIG. 8 is a conceptual view of a pattern image on a photosensitive material to illustrate the operation of a conventional apparatus;

DETAILED DESCRIPTION OF PREFERRED EMBODIMENTS

Figure 1:
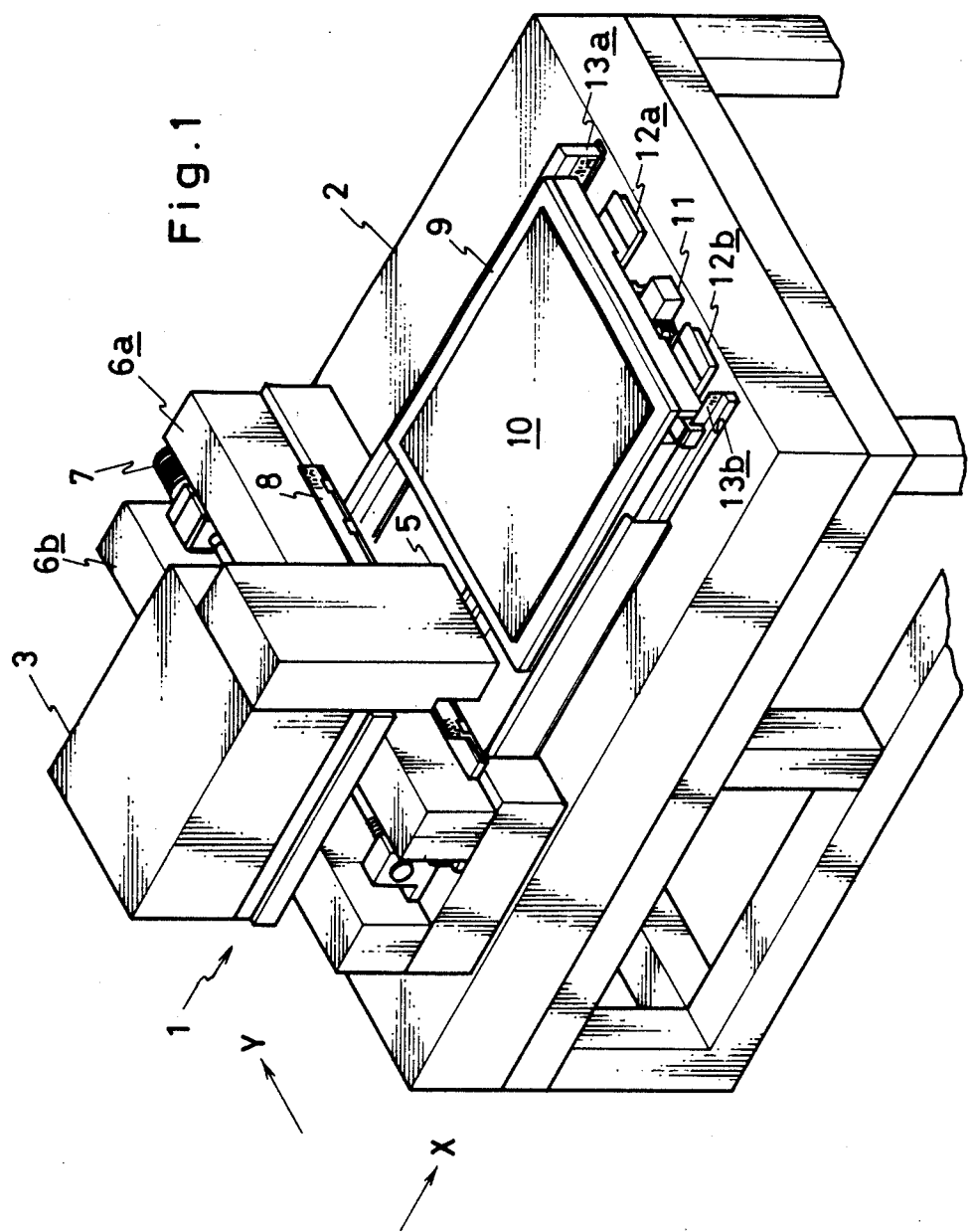
FIG. 1 is a perspective view of a recording apparatus according to the present invention.

Referring to FIG. 1, a recording apparatus 1 is mounted on a table 2. The apparatus 1 comprises a laser tube housing 3 within which a laser tube 4 is mounted. The laser tube housing 3 has a recording head 5 for emitting two rows of laser beams downward. The housing 3 and the recording head 5 are contained within a unit and the unit is slidably mounted on a pair of guide rails 6a and 6b. This unit is movable in a sub-scanning direction as shown by an arrow Y by means of a motor 7. The movement of the recording head 5 is measured by a linear scale 8 mounted along the guide rail 6a.

Figure 2:
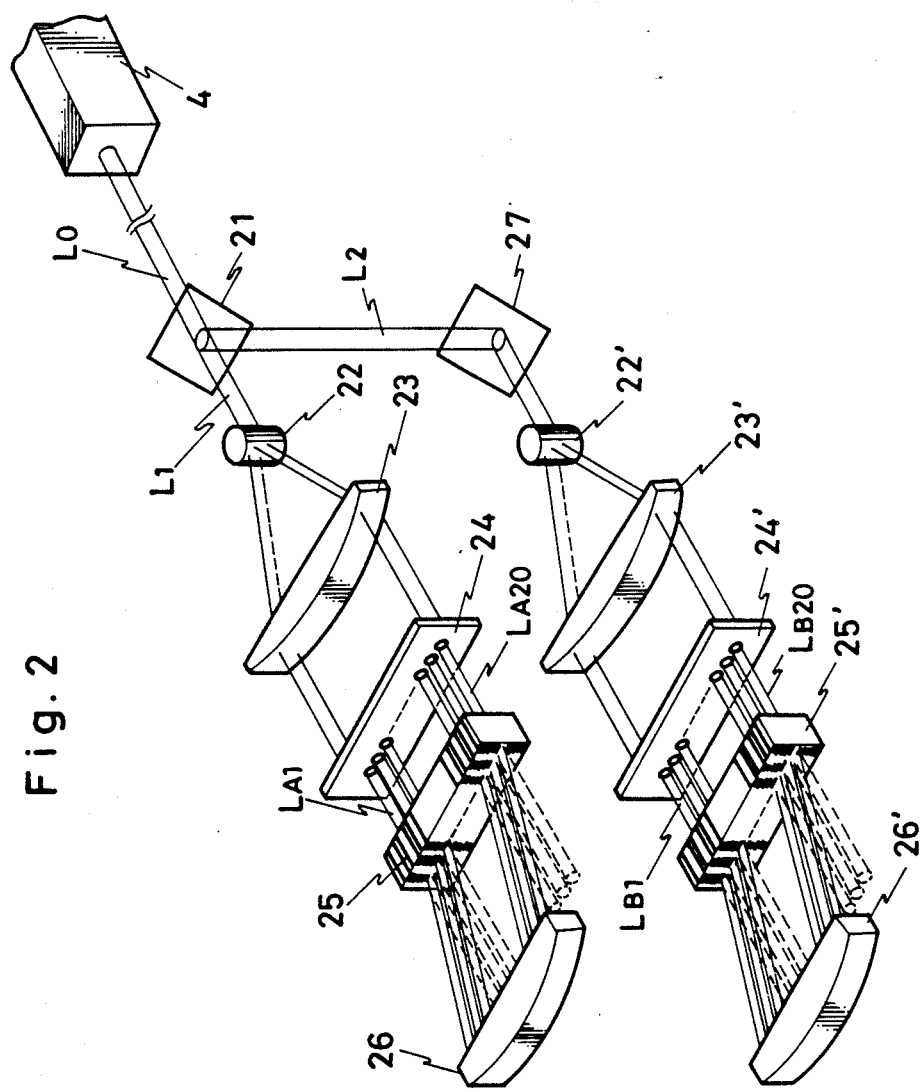
FIG. 2 is a schematic perspective view of an optical system for use in the recording apparatus shown in FIG. 1.

A movable bed 9 is also mounted on the table 2 and a photosensitive material 10 is received on the bed 9. The bed 9 is slidably supported by a pair of guide rails 12a and 12b and is moved by a linear motor 11 provided under the bed 9 in a main scanning direction as denoted by an arrow X. The movement of the bed 9 is measured by a linear scale 13a mounted along one side of the bed 9. There is another linear scale 13b on the other side of the bed for generating timing pulses each 10 $\mu$m. The timing pulses are used for controlling a pair of AOMs 25 and 25' (FIG. 2). The movement of the recording head 5 and that of the bed 10 are perpendicular to each other.

FIG. 2 shows an optical system for use within the recording apparatus 1. The optical system is schematically illustrated for simplicity of illustration. A laser beam $L_0$ emitted from the laser tube 4 (of e.g. Ar+) is first divided by a beam splitter 21 into two beams $L_1$ and $L_2$. The former L, advances along a first optical path and the latter $L_2$ along a second optical path.

The laser beam $L_1$ transmitted through the splitter 21 is received by a rod lens 22, by which the laser beam $L_1$ is diffused to the extent suitable to be received by the wide surface of a cylindrical lens 23. The cylindrical lens functions as a collimator lens, so that the diffused beam is collimated to impinge upon an aperture plate 24. The aperture plate 24 has twenty apertures each with a diometer of e.g. 0.6 mm. The apertures are provided in a row at predetermined intervals. The beam is thus formed into twenty beams $L_{A1}$ to $L_{A20}$, each of which has a uniform distribution of light quantity throughout the diameter thereof. The twenty beams $L_{A1}$ to $L_{A20}$ are substantially identical to each other.

These beams $L_{A1}$ to $L_{A20}$ are then received by an AOM 25, by which they are modulated on the basis of image signals of a desired circuit pattern image. The modulated beams are in turn received by an objective lens 26, by which the row of recording beams are converged on the photosensitive material 10. Each recording spot formed by the recording beams converged on the photosensitive material is reduced up to 5.0 $\mu$m in diameter and the interval between adjacent recording spots is reduced so that recording spots are close to each other.

On the other hand, the laser beam $L_2$ reflected by the beam splitter 21 impinges upon a folding mirror 27 to advance appropriately in parallel with the beam $L_1$. Optical elements provided along the second optical path, i.e. a rod lens 22', a cylindrical lens 23', an aperture plate 24', an AOM 25' and an object lens 26', are substantially the same and are arranged substantially in the same manner as those provided along the first optical path. Accordingly, the laser beam $L_2$ reflected by the folding mirror 27 advances substantially in the same manner as the beam $L_1$ advancing along the first optical path, whereby a row of twenty recording spots $L_{B1}$ to $L_{B20}$ are formed on the photosensitive material 10. The distance between the two rows of recording beams is controlled by an appropriate optical element (not shown).

Figure 3:
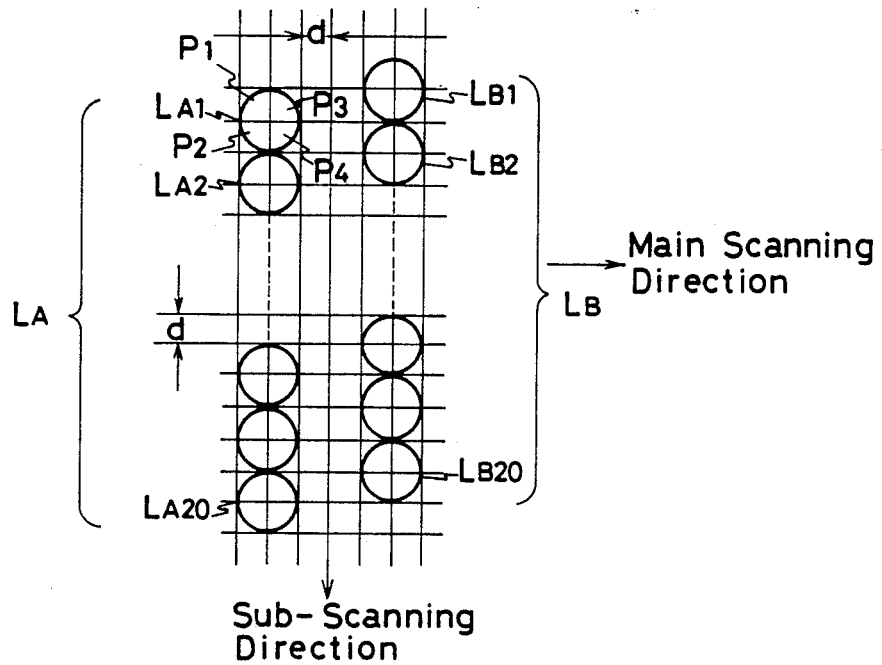
FIG. 3 is a conceptual view of rows of recording spots on a photosensitive material to illustrate the operation of the present invention.

Referring to FIG. 3, there is shown a conceptual view of the rows of recording spots effected by the recording beams $L_{A1}$ to $L_{A20}$ and $L_{B1}$ to $L_{B20}$ on the photosensitive material 10. Assuming that each pixel has a width of d, e.g. 2.5 $\mu$m, both in the main scanning and sub-scanning directions, each recording spot effected on the photosensitive material 10 has a diameter of approximately 2d, i.e. twice of the pixel width.

As understood from FIG. 3, the second row $L_B$ of the recording spots $L_{B1}$ to $L_{B20}$ formed by the second row of recording beams is shifted by a length equal to four pixels in the main scanning direction from the first row $L_A$ of the recording spots $L_{A1}$ to $L_{A20}$. Furthermore each recording spot of the second row $L_B$ is shifted by a length equal to one pixel in the sub-scanning direction from each recording spot of the first row $L_A$. This is because two rows of recording beams will cause interference fringes on the photosensitive material when coherent electromagnetic waves such as the laser are formed by are superimposed on each other.

Although each recording spot aligned in each row is illustrated as being in contact with another spot, each recording spot is actually spaced slightly apart from each other so as to prevent the formation of interference fringes.

Further, although each row of the recording spots is illustrated as shifted by a length equal to four pixels, this illustration is conceptual for the sake of easy understanding and in order to avoid unnecessary complexity of the illustration. Actually, exposure of the first row of the recording spots $L_{A1}$ to $L_{A20}$ is delayed for a length corresponding to four pixels. Accordingly, in a practical operation the first and second rows of the recording spots are accurately positioned in the main scanning direction by controlling the AOMs 25 and 25' on the basis of image signals to be recorded.

Referring back to FIG. 1, the rows of the recording beams are emitted downwardly from the bottom of the recording head 5, so that rows of recording spots are aligned on the photosensitive material 10 in the Y-direction (i.e. sub-scanning direction). Meanwhile, the photosensitive material 10 received on the bed 9 is moved in the X-direction (i.e. main scanning direction). After the recording spots traverse the photosensitive material in the main scanning direction, the recording head 5 is moved in the sub-scanning direction by a length exactly corresponding to the rows of the recording spots. Then, the photosensitive material 10 is moved in the opposite direction. In this a manner a desired circuit pattern is recorded on the whole surface of the photosensitive material. That is, the photosensitive material is moved to and fro in the main scanning direction, and the recording head 5 is moved intermittently in the sub-scanning direction synchronously with the movement of the photosensitive material.

Figure 4:
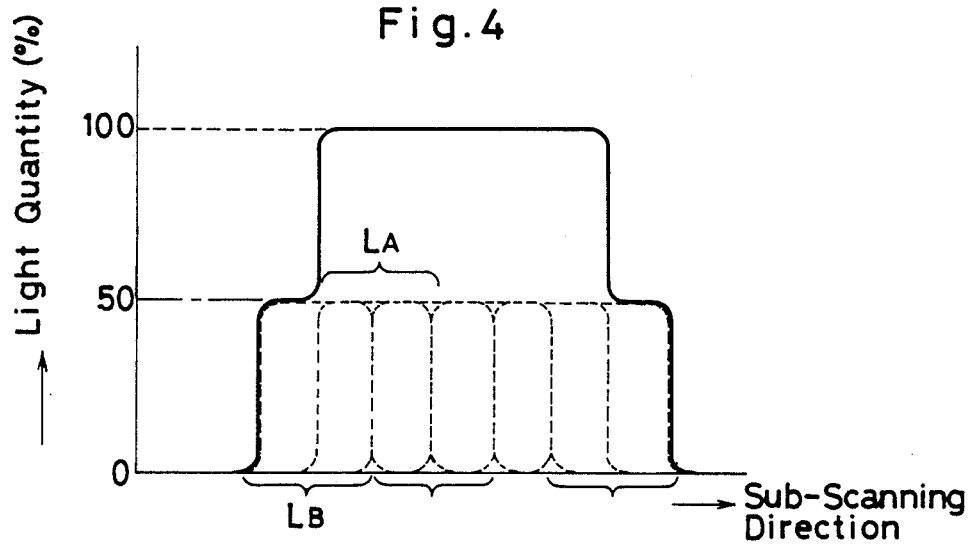
FIG. 4 is a graph showing a distribution of light quantity to illustrate the operation of the present invention.
Figure 10:
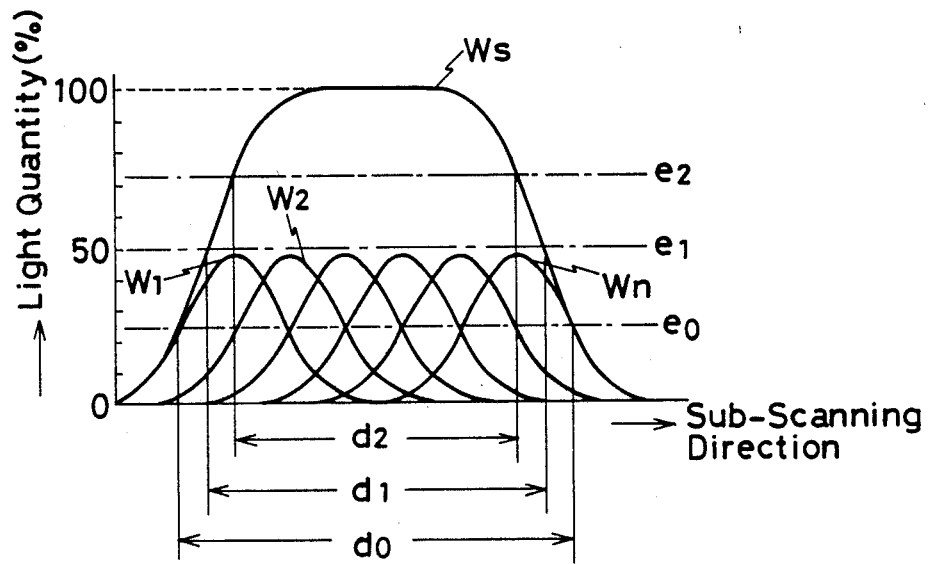
FIG. 10 is a graph showing a distribution of light quantity on a photosensitive material to illustrate a conventional method.

FIG. 4 shows the distribution of light quantity effected by the rows of the recording spots, from which it may be apparent in comparison with FIG. 10 that the distribution of light quantity effected by the present invention represents a very uniform distribution throughout the width of the each row, whereas distribution of light quantity shown in FIG. 10 represents a less uniform Gaussian distribution. This is because the aperture plate 24, allows only uniform units of light quantity to be transmitted, for use in recording on the photosensitive material.

Figure 5:
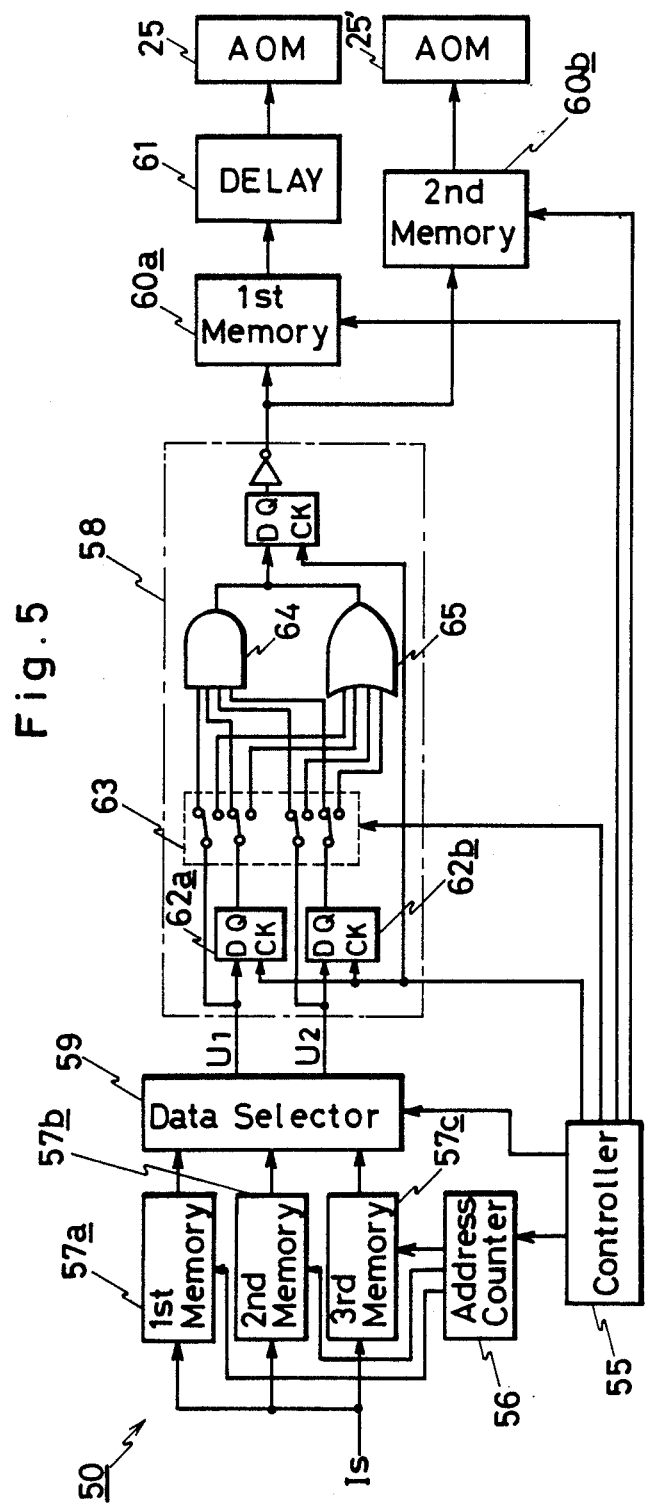
FIG. 5 is a block diagram showing an image signal processing circuit.
Figure 9:
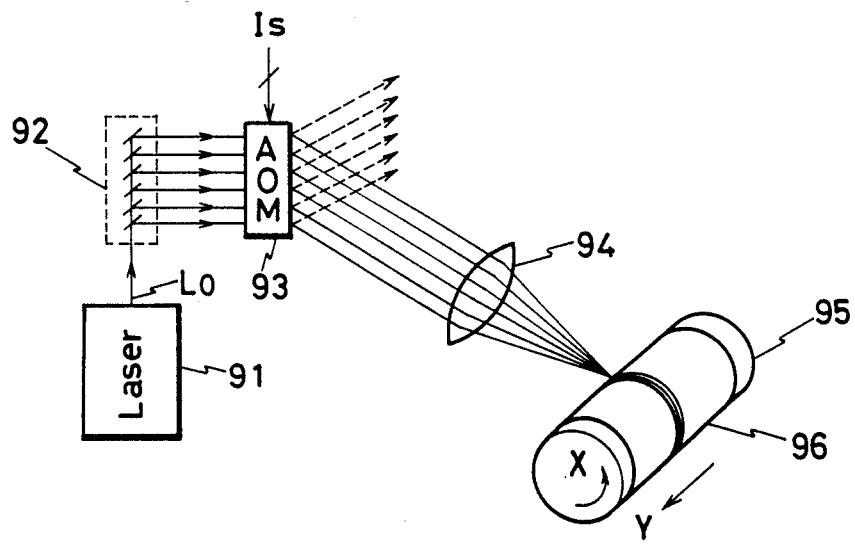
FIG. 9 is a schematic view of a conventional recording apparatus.

FIG. 5 shows an example of the image signal processing circuit controlling the AOMs 25 and 25' on the basis of image signals of a desired circuit pattern image. It is known in the art to obtain binary image signals are from an original circuit pattern image. Accordingly, a detailed explanation of how such binary image signals are obtained is omitted here.

Binary signals of an original circuit pattern image are serially inputted into the input terminal of the image signal processing circuit 50. The image signals corresponding to the first three lines of pixels aligned in the sub-scanning direction are stored in three line memories 57a, 57b and 57c, respectively, on the basis of control of a controller 55 via an address counter 56.

The image signals stored in the line memories 57a and 57b are first read out by a data selector 59, so that a unit of four pixels associated with the current pixel to be considered is selected. For example, assuming that the pixel denoted by the numeral $P_1$ (in FIG. 3) is regarded as the current pixel to be considered, then four pixels including the pixel $P_1$ to be considered and three adjacent pixels $P_2$, $P_3$ and $P_4$ are selected as a unit by the data selector 59. Image signals of the pixels $P_1$ and $P_3$ are read out through lines $U_1$ and $U_2$, respectively, and are latched by latch circuits 62a and 62b. Then, image signals of the pixels $P_2$ and $P_4$ are read out through the lines $U_1$ and $U_2$, respectively. These image signals of the four pixels $P_1$ to $P_4$ are inputted to a switching circuit 63. Thus, all image data of the units aligned in the sub-scanning direction are serially outputted from the data selector 59 while the pixels in the first line of pixels are processed. Substantially in the same manner as above, all image data of the units with respect to the second row of the pixels are outputted, while image signals of the fourth line of the pixels are inputted to the first line memory 57a.

An AND gate 64 and an OR gate 65 are connected to the switching circuit 63 in parallel so that image signals are alternatively supplied to the AND gate 64 and the OR gate 65. Image signals processed with respect to from the first line of the pixels are outputted either from the AND gate 64 the or OR gate 65 and inputted into a first data memory 60a. Image signals processed with respect to the second line of pixels are inputted to a second data memory 60b. Then, the image signals stored in both the first and second data memories 60a and 60b are read out as controlled by the controller 55. The image signals outputted from the first data memory 60a are inputted to a delay circuit 61 so that outputting of signals from the first data memory is delayed by the length corresponding to four pixels. The signals are then inputted to first AOM 25 synchronously with the inputting of image signals read out from the second data memory 60b to the second AOM 25'. Thus, the AOMs 25 and 25' are controlled on the basis of image signals processed by the image signal processing circuit 58.

As seen in FIG. 5, both the data memories 60a and 60b are independently controlled by the controller 55. All of the image data of the original pattern are processed by the processing circuit 58 substantially in the same manner as described above.

In the processing circuit 58, the selection of whether the AND gate 64 or the OR gate 65 should be connected to the latch circuits 62a and 62b is determined on the basis of the critical exposure value of the photosensitive material to be used.

Assuming that the current pixel to be considered locates at i-th row in the sub-scanning direction and at j-th line in the main scanning direction (hereinafter this position is represented by $D_{ij}$), the area exposed by the recording spot corresponding thereto includes four pixels represented by $D_{ij}$, $D_{(i+1)j}$, $D_{i(j+1)}$ and $D_{(i+1)(j+1)}$. When the AND gate 64 is connected to the selector 59, only the area where the logical product of the formula:

$$D_{ij} \cdot D_{(i+1)j} \cdot D_{i(j+1)} \cdot D_{(i+1)(j+1)}$$

is "1" will be exposed by the recording spot. When the OR gate is connected to the selector 59, the area where the logical sum of the formula:

$$D_{ij} + D_{(i+1)j} + D_{i(j+1)} + D_{(i+1)(j+1)}$$

is "1" will be exposed by the recording spot.

Referring to FIGS. 6-(A) and 7-(A), an image pattern to be recorded on a photosensitive material is enclosed by a thick line. Numerals denoted in the matrices represent the number of times a corresponding pixel is exposed.

As mentioned above, since the diameter of the respective recording spots is twice the pixel width, when the pixel $D_{ij}$ is within the image pattern to be recorded, the pixel will be exposed at the time when the adjacent pixels $D_{(i-1)(j-1)}$, $D_{i(j-1)}$ and $D_{(i-1)j}$ are recorded. Accordingly, the pixel $D_{ij}$ will eventually be exposed four times. The numeral "4" denoted in the matrix shown in FIGS. 6-(A) and 7-(A) indicates that the pixel is exposed four times. In the same manner, the remaining numerals "3", "2" and "1" represent three exposures, two exposures, and one exposure respectively. The pixels denoted by the numerals "0" are not exposed by a recording spot.

The image pattern shown in FIG. 6-(A) is effected by selecting the OR gate 65 and the pixels around the image pattern enclosed by the thick line are allocated numerals equal to or less than "3". FIG. 6-(B) shows the exposure values at the position of the line E-E of FIG. 6-(A). Assuming that the critical exposure value of the photosensitive material to be used is between the amount of exposure represented by numerals "4" and "3" then the image pattern area enclosed by the thick line is exactly recorded on the photosensitive material and the area outside of the thick line is not recorded on the photosensitive material.

When the image pattern area is to be subsequently reduced, e.g., during an etching treatment, the reduction of the image pattern can be accommodated by using a critical exposure value between the amount represented by the numerals "1" and "0". This exponds the image pattern area outwardly by one pixel.

In to FIG. 7-(A), the image pattern is effected by selecting the AND gate 64 and the pixels within the image pattern enclosed by the thick line are allocated numerals "4" through "1". Pixels outside the image pattern are allocated the numeral "0". FIG. 7-(B) shows the exposure values along the line F—F of FIG. 7-(A). Assuming the critical exposure value of the photosensitive material to be used is between "0" and "1", the image pattern enclosed by the thick line is recorded on the photosensitive material.

FIG. 8 shows an image pattern to be exposed without the logical calculation, for comparison with the results effected by the present invention. In FIG. 8, the numerals allocated in the matrix denote the number of exposures effected. It is apparent from FIG. 8 that the desired image pattern cannot be recorded on the photosensitive material, even when the critical exposure value is at any level between the numerals "0" to "4".

Consequently, according to the present invention, when the sensitivity of the photosensitive material to be used is relatively low (and hence the critical exposure value thereof is high relative to the light quantity imparted by the recording spot then the OR gate 65 is selected to obtain the logical sum shown in FIG. 6-(A), and to accurate record an pattern on the photosensitive material.

When the sensitivity of the photosensitive material to be used is high (and hence the critical exposure value thereof is low relative to the light quantity imparted by the recording spot), then the AND gate 64 is selected to obtain the logical product shown in FIG. 7-(A), whereby an accurate image pattern can be recorded on the photosensitive material.

In other words, the preferred embodiment of the invention can be selectively operated in two different modes to handle different photosensitive materials. When the photosensitive material to be used has a relatively low sensitivity, a first subsystem (including the OR gate 65) converges four light beams onto each pixel within the image bounded by the solid line in FIG. 6-(A). When photosensitive material with a relatively high sensitivity is used, a second subsystem (including the AND gate 64) converges at least one light beam onto each pixel within the image, while those pixels which are outside of the image are not exposed, as illustrated in FIG. 7-(A). The first and second subsystems have elements in common.

While the invention has been illustrated and described as an apparatus for and method of recording a binary image, it is not intended to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. An apparatus for recording a binary image on photosensitive material, said apparatus comprising:
   (a) means for providing a light beam which has a uniform intensity across its width;
   (b) converging means for reducing the diameter of said light beam on said photosensitive material so that said light beam covers an area corresponding to at least four adjacent pixels in a matrix;
   (c) modulating means for modulating said light beam; and
   (d) controlling means for controlling said modulating means on the basis of image data, said controlling means including:
      (i) two line memories for storing said image data;
      (ii) a selector and a latch means connected to said selector for synchronously outputting pixel data; and
      (iii) an AND gate and an OR gate connected to said latch means for outputting control signals for controlling said modulating means.

2. The apparatus of claim 1, wherein said converging means includes an objective lens.

3. The apparatus of claim 1, wherein said means for providing a light beam includes an apertured plate.

4. The apparatus of claim 1, wherein said selector is connected to said memories for selecting data corresponding to said adjacent pixels.

5. The apparatus of claim 1, wherein said controlling means includes means for alternatively connecting said AND gate and said OR gate to said latch means.

6. An apparatus for recording a binary image on photosensitive material, said apparatus comprising:
   (a) means for providing a row of adjacent recording beams separated by intervals, each one of said recording beams having a uniform intensity across its width;
   (b) converging means for reducing said intervals ad for reducing the diameter of each one of said recording beams on said photosensitive material so that each one of said recording beams covers an area corresponding to at least four adjacent pixels in a matrix,
   (c) modulating means for independently modulating each one of said beams; and
   (d) controlling means for controlling said modulating means on the basis of image data, said controlling means including:
      (i) two line memories for storing said image data;
      (ii) a selector and a latch means connected to said selector for synchronously outputting pixel data; and
      (iii) an AND gate and an OR gate connected to said latch means for outputting control signals for controlling said modulating means.

7. The apparatus of claim 6, wherein said converging means includes an objective lens.

8. The apparatus of claim 7, further comprising:
   means for dividing light from a light source into a first optical path and a second optical path, said means for providing a row of beams, said modulating means, said controlling means, and said objective lens being arranged along said first optical path;
   means for diffusing said light, and a collimator, said diffusing means and said collimator being arranged along said first optical path; and
   a second means for providing a row of second adjacent recording beams, each one of said second beams having a uniform intensity across its width, a second modulating means for modulating said second beams, a second controlling means for controlling said second modulating means, a second objective lens, a second means for diffusing light, and a second collimator, said second means for providing a row of second beams, said second modulating means, said second controlling means, said second objective lens, said second diffusing means, and said second collimator being arranged along said second optical path.

9. The apparatus of claim 6, wherein said controlling means includes:
   means for alternatively connecting said AND gate and said OR gate to said latch means; and
   first and second memories connected to the output terminal of said AND gate and the output terminal of said OR gate.

10. The apparatus of claim 9, wherein said controlling means includes a delay circuit connected to said first memory, said delay circuit and said second memory being connected to said modulating means to synchronously control said modulating means.

11. The apparatus of claim 6, further comprising:
   means for moving photosensitive material in a first direction; and
   means for feeding said row of beams in a second direction, said second direction being perpendicular to said first direction, said row of beams being aligned in said second direction, said feeding means including means for feeding said row of beams by the length of said row after each movement of said photosensitive material in said first direction so as to scan the whole surface of said photosensitive material by said beams.

12. An apparatus for exposing photosensitive material to form an image thereon, comprising:
   (a) a first subsystem, including means for converging four light beams onto each pixel within an image; and
   (b) a second subsystem, including:
      (i) means for converging a light beam onto each pixel within said image; and
      (ii) means for modulating light beams so that no light beam is converged onto a pixel outside of said image; and
   (c) means for selectively enabling and disabling said first and second subsystems.

* * * * *